United States Patent
Connor (10) Patent No.: US 7,177,913 B2
(45) Date of Patent: Feb. 13, 2007

(54) METHOD, SYSTEM, AND PROGRAM FOR ADDING OPERATIONS IDENTIFYING DATA PACKETS TO STRUCTURES BASED ON PRIORITY LEVELS OF THE DATA PACKETS

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 10/314,473

(22) Filed: Dec. 5, 2002

(65) Prior Publication Data

US 2004/0111532 A1 Jun. 10, 2004

(51) Int. Cl.
*G06F 13/00* (2006.01)

(52) U.S. Cl. ...................................................... 709/212

(58) Field of Classification Search ................ 709/212, 709/213, 217
See application file for complete search history.

(56) References Cited

U.S. PATENT DOCUMENTS

| | | | | |
|---|---|---|---|---|
| 5,335,224 A | * | 8/1994 | Cole et al. ................... | 370/235 |
| 5,564,062 A | * | 10/1996 | Meaney et al. ............. | 710/244 |
| 5,959,993 A | * | 9/1999 | Varma et al. ................ | 370/397 |
| 6,085,215 A | * | 7/2000 | Ramakrishnan et al. .... | 718/102 |
| 6,343,155 B1 | * | 1/2002 | Chui et al. .................. | 382/240 |
| 6,470,016 B1 | * | 10/2002 | Kalkunte et al. ....... | 370/395.41 |
| 6,862,265 B1 | * | 3/2005 | Appala et al. .............. | 370/235 |
| 6,944,171 B2 | * | 9/2005 | Ahlfors et al. .............. | 370/412 |

OTHER PUBLICATIONS

IEEE Computer Society, "802.3- IEEE Standard for Information Technology-Telecommunications and Information Exchange Between Systems- Local and Metropolitan Area Networks- Specific Requirements- Part 3: Carrier Sense Multiple Access with Collision Detection (CSMA/CD) Access Method and Physical Layer Specifications", *IEEE Std 802.3*, Mar. 8, 2002, Introduction, Section 1, Section 2, and Section 3, pp. i-xxiii, 1-552, 1-582, & 1-379 respectively.

Information Sciences Institute, "Internet Protocol", *DARPA Internet Program Protocol Specification*, [online], RFC 791, Sep. 1981, pp. 1-45, [Retrieved on Dec. 18, 2003]. Retrieved from the Internet at <URL: ftp://ftp.rfc-editor.org/in-notes/std/std5.txt>.

(Continued)

*Primary Examiner*—David Y. Eng
(74) *Attorney, Agent, or Firm*—Janaki K. Davda; Konrad Raynes & Victor LLP (57) ABSTRACT

Disclosed is a method, system, and program for adding an operation (e.g., an operation that provides information about data for transfer or a storage operation) to a structure (e.g., a queue). If a priority level associated with a data packet identified by the operation has a first designation comprising a high priority, placing the operation into a first structure (e.g., a queue) with a least number of operations. If the priority level associated with the data packet identified by the operation has a second designation comprising a low priority, placing the operation into a second structure (e.g., a queue) with a most number of operations.

27 Claims, 5 Drawing Sheets

OTHER PUBLICATIONS

Information Sciences Institute, "Transmission Control Protocol", *DARPA Internet Program Protocol Specification*, [online], RFC 793, Sep. 1981, pp. 1-85, [Retrieved on Dec. 18, 2003]. Retrieved from the Internet at <URL: http://www.ibiblio.org/pub/docs/rfc/rfc793.txt>.

Krueger, M., R. Haagens, C. Sapuntzakis, & M. Bakke. "Small Computer Systems Interface protocol over the Internet (iSCSI) Requirements and Design Considerations", [online], RFC 3347, Jul. 2002, [Retrieved on Dec. 18, 2003]. Retrieved from the Internet at <URL: ftp://ftp.rfc-editor.org/in-notes/rfc3347.txt>.

PCI Special Interest Group, "PCI-SIG Home Page", (*PCI Local Bus Specification, Rev. 2.3*, published Mar. 2002), [online], [Retrieved on Mar. 9, 2004]. Available from the Internet at <URL: http://www.pcisig.com>.

SERIAL ATA, "Specs and Design Guides", (*SATA 1.0a Specification*, published Feb. 4, 2003), [online]. Available from the Internet at <URL: http://www.serialata.com>.

T10 Publications, "How to Get T10 Draft Standards (and other Publications)", (American National Standards Institute (ANSI), *SCSI Controller Commands- 2 (SCC-2)*, NCITS.318:1998), [online]. Available from the Internet at <URL: http://www.t10.org>.

Weber, R., M. Rajagopal, F. Travostino, M. O'Donnell, C. Monia, & M. Merhar. "Fibre Channel (FC) Frame Encapsulation", [online], RFC 3643, Dec. 2003, [Retrieved on Dec. 18, 2003]. Retrieved from the Internet at <URL: ftp://ftp.rfc-editor.org/innotes/rfc3643.txt>.

\* cited by examiner

METHOD, SYSTEM, AND PROGRAM FOR ADDING OPERATIONS IDENTIFYING DATA PACKETS TO STRUCTURES BASED ON PRIORITY LEVELS OF THE DATA PACKETS

BACKGROUND OF THE INVENTION

1. Field of the Invention

The present invention relates to a method, system, and program for adding operations identifying data packets to structures.

2. Description of the Related Art

In computer systems, components are coupled to each other via one or more buses. A variety of components can be coupled to a bus, thereby providing intercommunication between all of the various components. An example of a bus that is used for data transfer between a memory and another device is the peripheral component interconnect (PCI) bus.

In order to relieve a processor of the burden of controlling the movement of blocks of data inside of a computer, direct memory access (DMA) transfers are commonly used. With DMA transfers, data can be transferred from one memory location to another memory location, or from a memory location to an input/output (I/O) device (and vice versa), without having to go through the processor. Additional bus efficiently is achieved by allowing some of the devices connected to the PCI bus to be DMA masters.

When transferring data using DMA techniques, high performance Input/Output I/O controllers, such as gigabit Ethernet media access control (MAC) network controllers may be used. In particular, a host computer includes an Input/Output (I/O) controller for controlling the transfer of data packets to or from, for example, other computers or peripheral devices across a network, such as an Ethernet local area network (LAN). The term "Ethernet" is a reference to a standard for transmission of data packets maintained by the Institute of Electrical and Electronics Engineers (IEEE) and one version of the Ethernet standard is IEEE std. 802.3, published Mar. 8, 2002.

To read a data buffer of a memory using DMA transfers, such as when the data has to be retrieved from memory in response to a transmit command from an operating system so that the data can be transmitted by the I/O controller, a device driver for the I/O controller prepares the data buffer. A transmit command may be any indication that notifies the device driver of a data packet to be transferred, for example, over a network. The device driver writes one or more descriptors (i.e., that include the data buffer's physical memory address and length, etc.) to a command register of the I/O controller to inform the I/O controller that one or more descriptors are ready to be processed by the I/O controller. The I/O controller then DMA transfers the one or more descriptors from memory to another buffer and obtains the data buffer's physical memory address, length, etc. After the I/O controller has processed the one or more descriptors, the I/O controller can DMA transfer the contents/data in the data buffer.

A priority may be assigned to the data packets. For instance, for an Ethernet LAN, data packets are assigned a priority ranging from level 0 to 7, with 7 reflecting the highest priority level.

Some I/O controllers maintain one queue for storing high priority data packets that are waiting to be transferred and another queue for storing low priority data packets that are waiting to be transferred. Then, data packets are selected from the two queues and transferred with a round robin technique (i.e., a data packet from the high priority queue is selected for transfer, then a data packet from the low priority queue is selected for transfer, a data packet from the high priority queue is selected for transfer, etc.) by the I/O controller. Moreover, it is possible that low priority data packets may be transferred before queued high priority data packets. For example, if the majority of data packets are high priority, such as streaming audio or video data, the high priority queue may have several high priority data packets waiting to be transferred. If a low priority data packet is then stored in the low priority queue, which has few or no other pending data packets, the round robin selection of data packets for transfer would select the low priority data packet for transmission before selecting a pending high priority data packet.

This leads to a disruption of the transfer of high priority data packets (e.g., streaming audio or video data or protocol control packets). Therefore, there is a need for an improved technique for processing data packets in queues.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
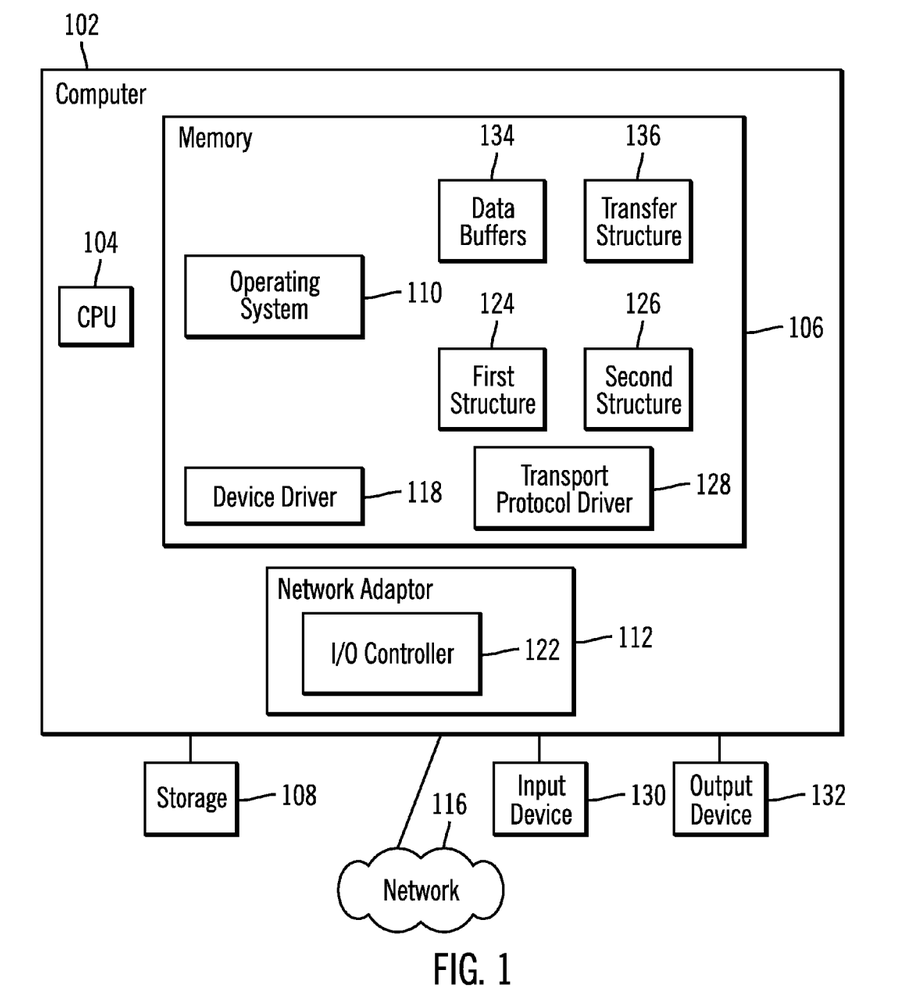
FIG. 1 illustrates a computing environment in which aspects of the invention may be implemented.

FIG. 1 illustrates a computing environment in which aspects of the invention may be implemented. A computer 102 includes a central processing unit (CPU) 104, a volatile memory 106, non-volatile storage 108 (e.g., magnetic disk drives, optical disk drives, a tape drive, etc.), an operating system 110, and a network adapter 112. The computer 102 may comprise any computing device known in the art, such as a mainframe, server, personal computer, workstation, laptop, handheld computer, telephony device, network appliance, virtualization device, storage controller, etc.

Any CPU 104 and operating system 110 known in the art may be used. The network adapter 112 includes a network protocol for implementing the physical communication layer to send and receive network packets to and from remote devices over a network 116. The network adapter 112 includes an I/O controller 122. In certain embodiments, the I/O controller 122 may comprise an Ethernet Media Access Controller (MAC) or network interface card (NIC), and it is understood that other types of network controllers, I/O controllers such as small computer system interface (SCSI controllers), or cards may be used.

The network 116 may comprise a Local Area Network (LAN), the Internet, a Wide Area Network (WAN), Storage Area Network (SAN), etc. In certain embodiments, the network adapter 112 may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

The storage 108 may comprise an internal storage device or an attached or network accessible storage. Programs in the storage 108 are loaded into the memory 106 and executed by the CPU 104. An input device 130 is used to provide user input to the CPU 104, and may include a keyboard, mouse, pen-stylus, microphone, touch sensitive display screen, or any other activation or input mechanism known in the art. An output device 132 is capable of rendering information transferred from the CPU 104, or other component, such as a display monitor, printer, storage, etc.

A device driver 118 includes network adapter 112 specific operations to communicate with the network adapter 112 and interface between the operating system 110 and the network adapter 112. In particular, the device driver 118 controls operation of the I/O controller 122 and performs other operations related to the reading of data packets from memory 106. The device driver 118 may be software that is executed by CPU 104 in memory 106.

In addition to the device driver 118, the computer 102 may include other drivers, such as a transport protocol driver 128. The transport protocol driver 128 executes in memory 106 and processes the content of messages included in the packets received at the network adapter 112 that are wrapped in a transport layer, such as TCP and/or IP, Internet Small Computer System Interface (iSCSI), Fibre Channel SCSI, parallel SCSI transport, or any other transport layer protocol known in the art.

In certain embodiments, the device driver 118 issues operations to the I/O controller 122. Although an operation may be any type of information, command, etc., for examples described herein, the term "transfer operation" will be used to refer to an operation that provides information about data for transfer (e.g., across an Ethernet LAN). Other operations (e.g., a storage operation that is used to store data into a structure) fall within the scope of the invention. An I/O controller 122 maintains a first structure 124 (e.g., a queue) and a second structure 126 (e.g., a queue) for storing the transfer operations. In certain embodiments, the device driver 118 issues transfer operations to the I/O controller 122 and places the transfer operations in the structures 124, 126. The transfer operations identify data packets stored in one or more data buffers 134. The I/O controller 122 processes the transfer operations in structures 124, 126 to transfer data packets from data buffers 134 to a transfer structure 136 (e.g., a First In First Out (FIFO) queue) for transfer over, for example, network 116.

Several of the devices of FIG. 1 maybe directly or indirectly coupled to a bus (not shown). For instance, the device driver 118 and the I/O controller 122 maybe coupled to the bus.

Although structures/buffers 124, 126, 132, and 134 are illustrated as residing in memory 106, it is to be understood that some or all of these structures/buffers may be located in a storage unit separate from the memory 106 in certain embodiments.

Figure 2:
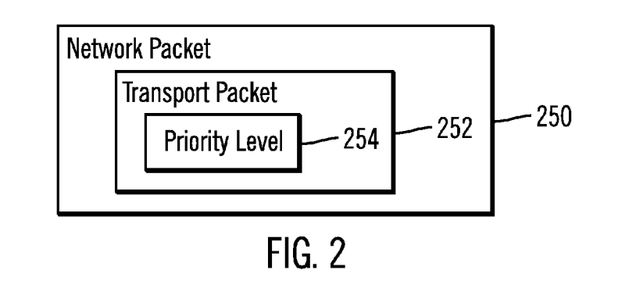
FIG. 2 illustrates a format of a data packet in accordance with certain embodiments of the invention.

FIG. 2 illustrates a format of a network packet 250 in accordance with certain embodiments of the invention. The network packet 250 is implemented in a format understood by the network protocol, such as an Ethernet packet that would include additional Ethernet components, such as a header and error checking code (not shown). A transport packet 252 is included in the network packet 250. The transport packet may 252 comprise a transport layer capable of being processed by the I/O controller 22, such as the TCP and/or IP protocol, Internet Small Computer System Interface (iSCSI) protocol, Fibre Channel SCSI, parallel SCSI transport, etc. The transport packet 252 includes a priority level 254 as well as other transport layer fields, such as payload data, a header, and an error checking code. The payload data includes the underlying content being transferred, e.g., commands, status and/or data. The operating system may include a device layer, such as a SCSI driver (not shown), to process the content of the payload data and access any status, commands and/or data therein.

The invention places transfer operations identifying data packets (e.g., descriptors identifying the physical memory address and length of the data buffers in which the data packets reside) into one of multiple (e.g., two) structures 124, 126 according to the priority level of the data packet to be placed into one of the structures 124, 126 and the number of pending data packets already stored in each of the structures. High priority data packets are placed on the structure with the fewest number of pending data packets, and low priority data packets are placed on the structure with the highest number of pending data packets.

Figure 3:
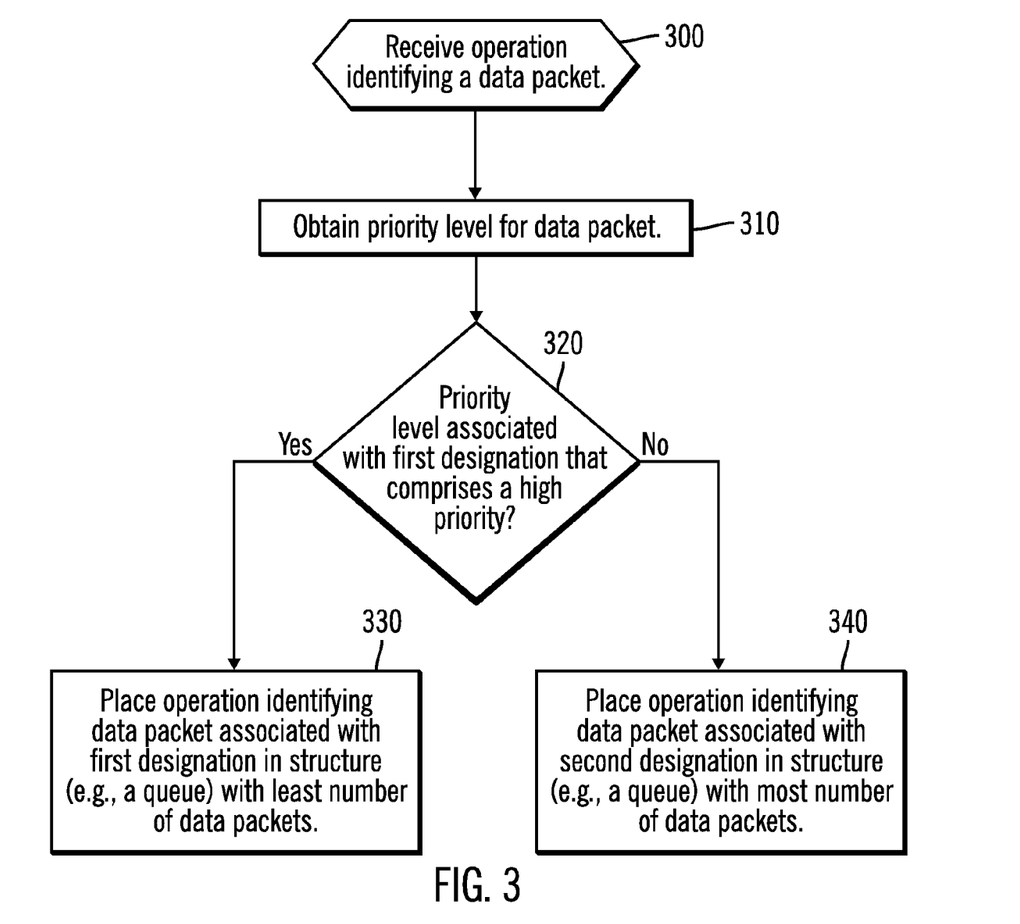
FIG. 3 illustrates logic implemented in a device driver in accordance with certain embodiments of the invention.

FIG. 3 illustrates logic implemented in a device driver 118 in accordance with certain embodiments of the invention. Control begins at block 300 with receipt of an operation identifying a data packet. In block 310, a priority level for the data packet is obtained. In certain embodiments, a priority level is included with the data packet. If a priority level is not already associated with the data packet, the priority level of the data packet may be calculated in block 310 or before block 310 based on one or more factors, such as whether the payload data includes audio or video data (e.g., audio or video data may be high priority so that the audio or video data packets are sent together to avoid disruption of an audio or video stream). In certain embodiments, the priority level may be associated with an alphabetic character, symbol, numeric value, or other value.

In block 320, it is determined whether the priority level has a first designation (e.g., a high priority level) or a second designation (e.g., a low priority level), and if the data packet has a first designation, processing continues to block 330, otherwise, processing continues to block 340. The first and second designations may be determined, for example, by a system administrator. For example, if there are eight priority levels, the top four priority levels (e.g., 4, 5, 6, and 7) may be designated as high priorities, while the remaining four priority levels (e.g., 0, 1, 2, and 3) may be treated as low priorities. In certain embodiments, block 320 may be modified to determine whether the priority level falls within a range. For example, if the priority level is associated with a character from "A" through "M", then in block 320 a determination may be made of whether the priority level of the data packet falls within "A" through "M" or "N" through "Z".

In block 330, the operation identifying the data packet associated with the first designation (e.g., high priority) is placed in the structure with the least number of data packets. If the structures are an equal length (e.g., have an equal number of data packets), then either structure may be chosen. In block 340, the operation identifying the data packet associated with the second designation (e.g., low priority) is placed in the structure with the most number of data packets.

When the operations are transfer operations, the invention ensures that data packets of similar priority are sent in the order that they were issued to the device driver 118. The transfer operations for data packets of similar priority are not necessarily stored on the same structure. That is, one structure is not designated for transfer operations for high priority data packets, while another structure is designated for transfer operations for low priority data packets.

If multiple high priority data packets are requested, the structure that is currently the shortest will change as transfer operations identifying data packets are added to the structure. In this case, the transfer operations for high priority data packets are added to the available structures in a round robin manner. This preserves the data packet order and does not allow subsequent transfer operations to bypass any of the transfer operations for high priority packets that are being added to the structures.

Subsequent transfer operations for low priority traffic is added to the structures behind these transfer operations for high priority requests and added to the longer of the structures. If the structures are an equal length, then either structure is chosen, and the chosen structure becomes the longer structure.

Figure 4:
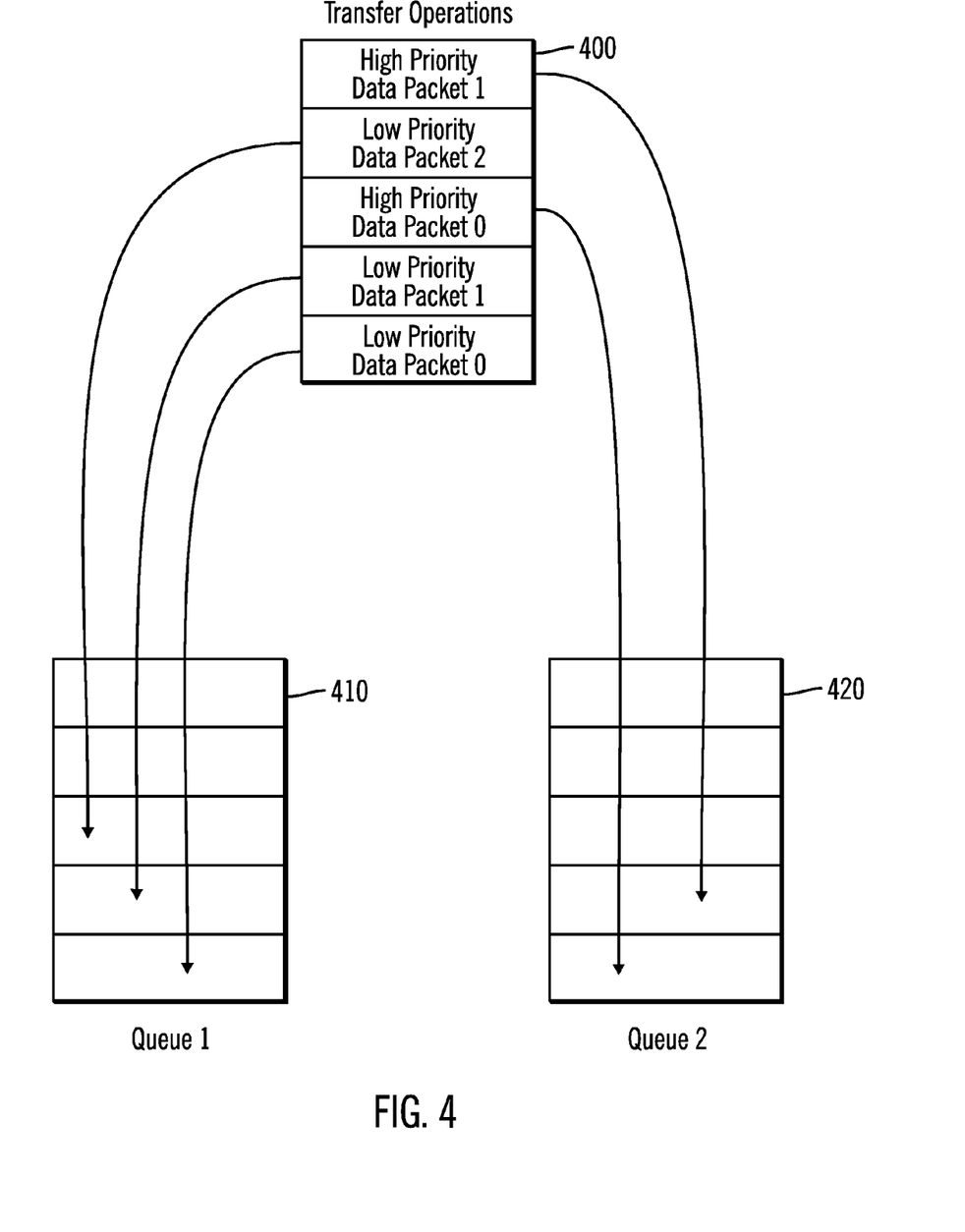
FIG. 4 illustrates an example set of transfer operations for high and low priority data packets being placed into queues in accordance with certain embodiments of the invention.
Figure 5:
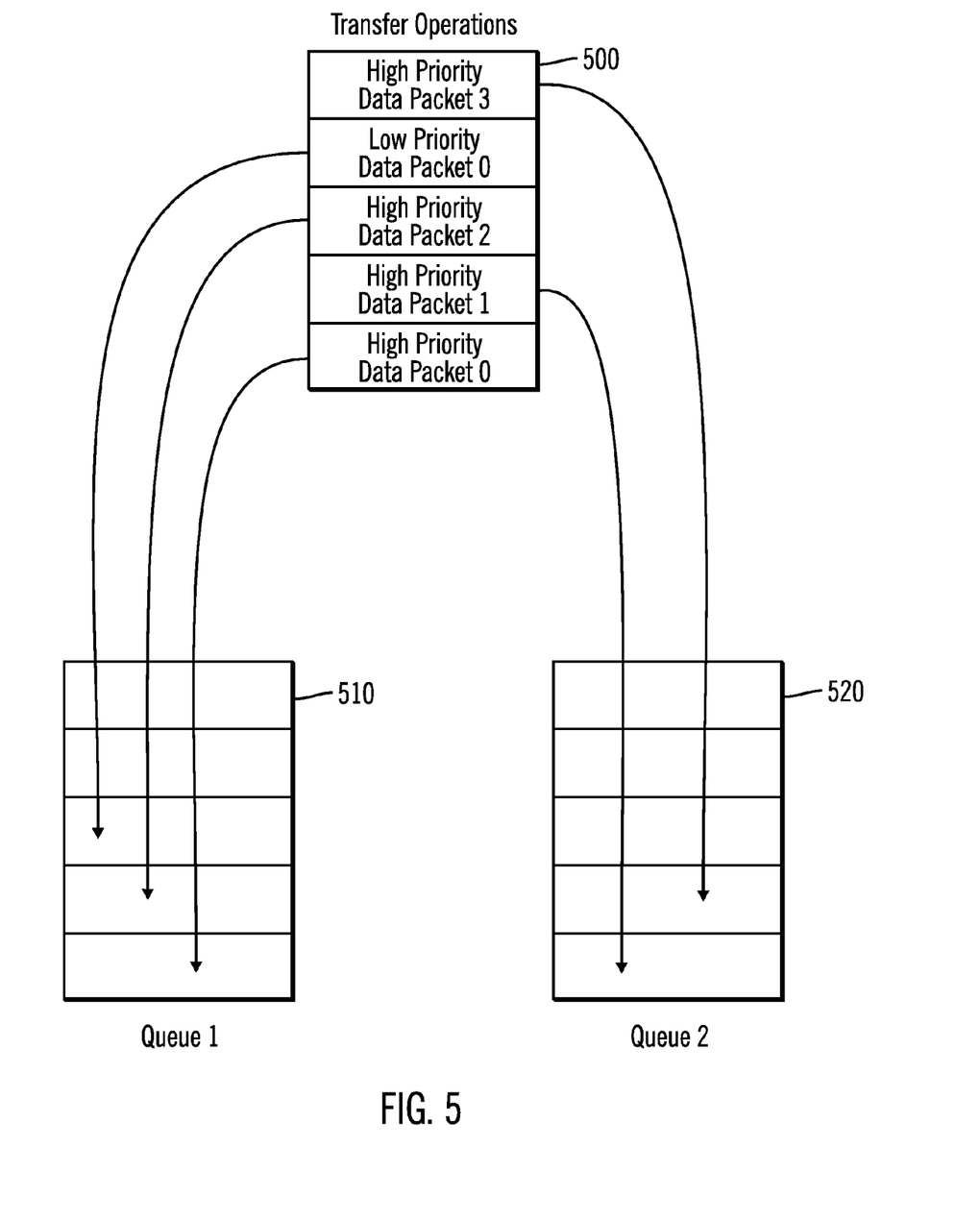
FIG. 5 illustrates an example set of transfer operations for mostly high priority data packets being placed into queues in accordance with certain embodiments of the invention.
Figure 6:
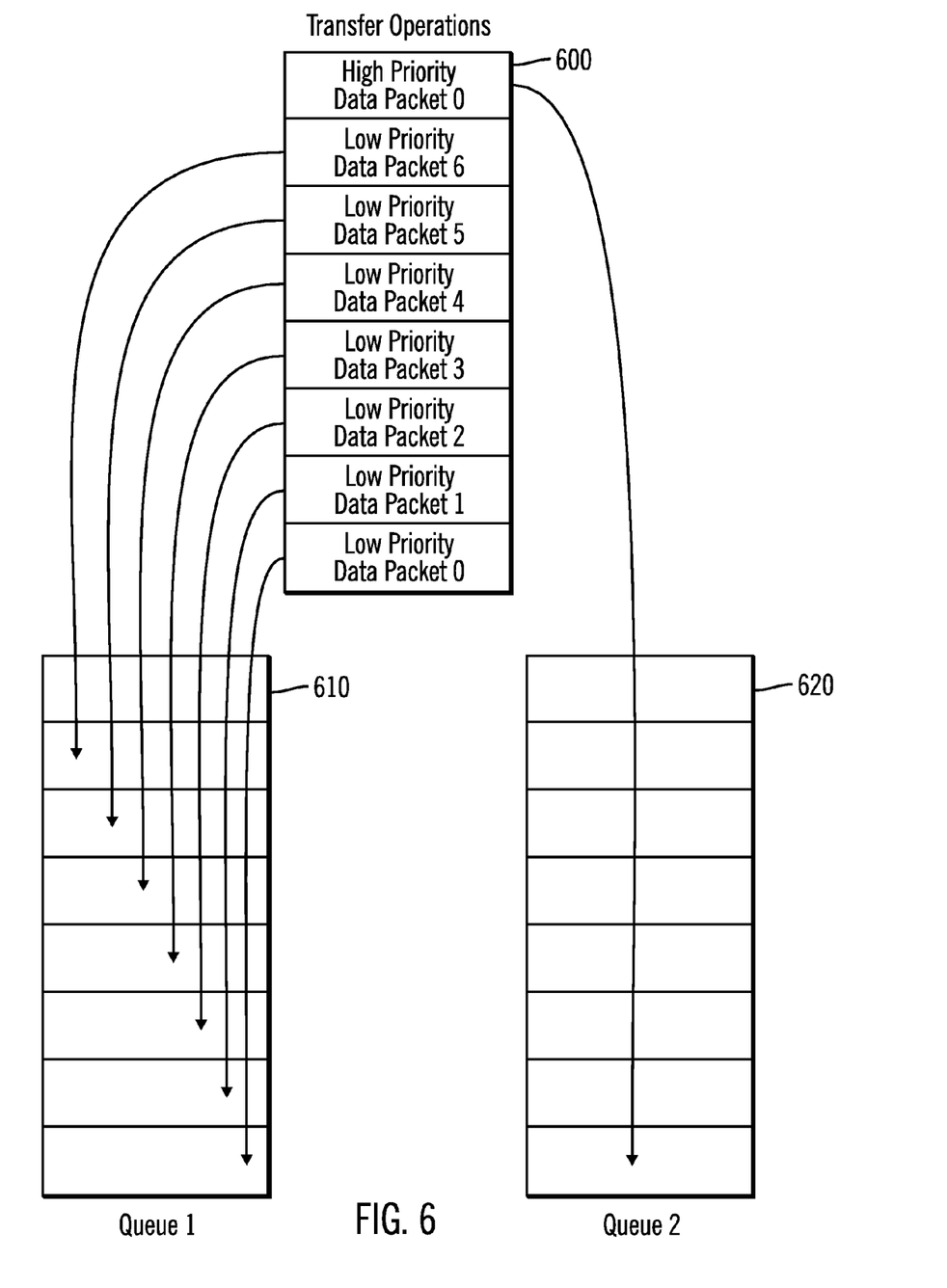
FIG. 6 illustrates an example set of transfer operations for mostly low priority data packets being placed into queues in accordance with certain embodiments of the invention.

FIG. 4 illustrates an example set of transfer operations for high and low priority data packets being placed into queues in accordance with certain embodiments of the invention. The device driver 118 inserts a set of transfer operations 400 identifying data packets into queues 410, 420 for access by the I/O controller 122. In the examples of FIGS. 4, 5, and 6, for ease of reference, it will be said that transfer operations are stored in the queues, although data packets may be stored as well. For ease of-reference, a number following "Data Packet" indicates the order of receipt of the transfer operation for the data packet of the specified priority level. For example, Low Priority Data Packet 0, Data Packet 1, and Data Packet 2 are transfer operations that are received in order of 0-1-2 and have low priority, and High Priority Data Packet 0 and Data Packet 1 are transfer operations that are received in the order of 0-1 and have high priority.

In this example, Low Priority Data Packet 0 identifies the first transfer operation received at the I/O controller 122 for transmission. Low Priority Data Packet 0 may be placed into either queue 410 or 420. For this example, Low Priority Data Packet 0 is placed into queue 1 410. Low Priority Data Packet 1 is received next and, since the data packet identified by this transfer operation has a low priority, the transfer operation is placed into the queue with most transfer operations (i.e., the longer queue), which is queue 1 410. Then, High Priority Data Packet 0 is placed into the queue with the least transfer operations (i.e., the shorter queue), which is queue 2 420. High Priority Data Packet 0 is likely to be transferred before Low Priority Data Packet 1. That is, Low Priority Data Packet 0 will be removed from queue 1 410 and processed, then High Priority Data Packet 0 will be removed from queue 2 420 and processed, before Low Priority Data Packet 1 is removed and processed. This depends on how long it takes to process Low Priority Data Packet 0 relative to when High Priority Data Packet 0 is added to queue 2 420.

Then, Low Priority Data Packet 2 is received and is placed into the longer queue 1 410, and High Priority Data Packet 1 is placed into the shorter queue 2 420. For this example, the data packets identified by the transfer operations are likely to be transferred over the network 116 in the following order: Low Priority Data Packet 0, High Priority Data Packet 0, Low Priority Data Packet 1, High Priority Data Packet 1, Low Priority Data Packet 0.

Relative to the order of the transfer operations requested, the high priority evens have bypassed lower priority transfer operations. With longer queue lengths, it would be possible for high priority operations to by pass several low priority operations. When queue lengths are long, it is important for high priority data packets to receive preferential treatment in order to avoid high latency.

FIG. 5 illustrates an example set of transfer operations for mostly high priority data packets being placed into queues in accordance with certain embodiments of the invention. The device driver 118 inserts a set of transfer operations 500 identifying data packets into queues 510, 520 for access by the I/O controller 122. In this example, High Priority Data Packet 0 is received at the I/O controller 122. High Priority Data Packet 0 may be placed into either queue 510, 520. In this example, High Priority Data Packet 0 is placed in queue 1 510. High Priority Data Packet 1 is then placed into shorter queue 2, 520. High Priority Data Packet 2 is placed into the shorter queue 1 510. Low Priority Data Packet 0 is placed into the longer queue 1 510. High Priority Data Packet 3 is placed into the shorter queue 2 520.

In this example, the data packets identified by the transfer operations are likely to be transferred over the network 116 in the following order: High Priority Data Packet 0, High Priority Data Packet 1, High Priority Data Packet 2, High Priority Data Packet 3, and Low Priority Data Packet 0. This allows High Priority Data Packet 3 to bypass Low Priority Data Packet 0.

FIG. 6 illustrates an example set of transfer operations for mostly low priority data packets being placed into queues in accordance with certain embodiments of the invention. The device driver 118 inserts a set of transfer operations 400 identifying data packets into queues 610, 620 for access by the I/O controller 122. In this example, Low Priority Data Packet 0 is placed into queue 1 610. Then each other Low Priority Data Packet 1, 2, 3, 4, 5, 6 are placed into queue 1 610. High Priority Data Packet 0 is placed into the shorter queue 2 620. Depending on the rate the transfer operations are requested and the operation processing time, High Priority Data Packet 0, which was requested last for transfer may be the second data packet to be transferred.

In this example, the data packets identified by the transfer operations are likely to be transferred over the network 116 in the following order: Low Priority Data Packet 0, High Priority Data Packet 0, Low Priority Data Packet 1, Low Priority Data Packet 2, Low Priority Data Packet 3, Low Priority Data Packet 4, Low Priority Data Packet 5, and Low Priority Data Packet 6. This allows a high priority data packet to be given preferential treatment and to bypass multiple low priority data packets. Thus, the high priority data packet was sent with lower latency than the low priority data packets.

Thus, the described embodiments of the invention provide a method, system, and program for a technique for using multiple transfer structures (e.g., queues )of equal priority on an I/O controller to provide preferential treatment of high priority data packets that are to be transferred, for example, across a network.

Additional Embodiment Details

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, flash, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were performed by the device driver 118. In alternative embodiments, these operations may be performed by another device, such as the I/O controller 122 or by firmware.

In the described embodiments, the data packets were transferred over a network 116. In alternative embodiments, the data packets may be transferred to local storage, to a peripheral device, or to another device without being transferred over the network 116.

In the described embodiments, two structures were described for storing data packets. In alternative embodiments, more than two structures may be maintained and data packets with high priority are added to the shortest structure, while data packets with low priority are added to the longest structure. In yet other alternative embodiments, with two or more structures available, data packets with a certain priority level (e.g., low priority) may be placed into a buffer and added to the structures at a later time.

In the described embodiments, transfer operations were added to structures. In alternative embodiments, any type of operation (e.g., a storage operation that is used to store data into a structure) may be added.

The illustrated logic of FIG. 3 describes specific logic operations occurring in a particular order. In alternative embodiments, certain of the logic operations may be performed in a different order, modified or removed. Moreover, steps may be added to the above described logic and still conform to the described embodiments. Further, logic operations described herein may occur sequentially or certain logic operations may be processed in parallel, or logic operations described as performed by a single process may be performed by distributed processes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for adding an operation to a structure, comprising:

if a priority level associated with a data packet identified by the operation has a first designation that comprises a high priority, placing the operation into a first structure storing a least number of operations; and if the priority level associated with the data packet identified by the operation has a second designation that comprises a low priority, placing the operation into a second structure storing a most number of operations.

2. The method of claim 1, further comprising:

generating the priority level associated with the data packet based on content of the data packet.

3. The method of claim 1, wherein the first structure comprises a queue.

4. The method of claim 1, wherein the second structure comprises a queue.

5. The method of claim 1, wherein the operation is placed into the first structure or the second structure by a device driver.

6. The method of claim 1, further comprising:

removing operations from the first and second structures with a round robin technique.

7. The method of claim 1, wherein the priority level associated with the data packet has the first designation or the second designation based on a range within which the priority level falls.

8. The method of claim 1, wherein the data packet comprises an Ethernet data packet.

9. A system for adding an operation to a structure, comprising:

a processor;

memory coupled to the processor;

a first structure storing a least number of operations;

a second structure storing a most number of operations; and at least one program executed by the processor in the memory to cause the processor to perform:

(i) if a priority level associated with a data packet identified by the operation has a first designation that comprises a high priority, placing the operation into the first structure; and (ii) if the priority level associated with the data packet identified by the operation has a second designation that comprises a low priority, placing the operation into the second structure.

10. The system of claim 9, wherein the at least one program further causes the processor to perform:

generating the priority level associated with the data packet based on content of the data packet.

11. The system of claim 9, wherein the at least one program comprises a device driver program.

12. The system of claim 9, wherein the at least one program further causes the processor to perform:

removing operations from the first and second structures with a round robin technique.

13. The system of claim 9, wherein the priority level associated with the data packet has the first designation or the second designation based on a range within which the priority level falls.

14. A system, comprising:
   a first structure storing a least number of operations;
   and a second structure storing a most number of operations; and
   a device driver to,
   (i) if a priority level associated with a data packet identified by the operation has a first designation that comprises a high priority, place the operation into the first structure; and
   (ii) if the priority level associated with the data packet identified by the operation has a second designation that comprises a low priority, place the operation into the second structure.

15. The system of claim 14, wherein the device driver is capable to generate the priority level associated with the data packet based on content of the data packet.

16. The system of claim 14, further comprising:
   an input/output controller to read the first structure and the second structure.

17. The system of claim 14, wherein the input/output controller is capable to remove operations from the first and second structures with a round robin technique.

18. The system of claim 14, wherein the priority level associated with the data packet has the first designation or the second designation based on a range within which the priority level falls.

19. An article of manufacture comprising one of hardware logic or a computer readable medium including a program executable by the hardware logic or a computer for adding an operation to a structure, wherein the program causes operations to be performed, the operations comprising:
   if a priority level associated with a data packet identified by the operation has a first designation that comprises a high priority, placing the operation into a first structure storing a least number of operations; and
   if the priority level associated with the data packet identified by the operation has a second designation that comprises a low priority, placing the operation into a second structure storing a most number of operations.

20. The article of manufacture of claim 19, the operations further comprising:
   generating the priority level associated with the data packet based on content of the data packet.

21. The article of manufacture of claim 19, wherein the program comprises a device driver program.

22. The article of manufacture of claim 19, wherein the operations are removed from the first and second structures with a round robin technique.

23. The article of manufacture of claim 19, wherein the priority level associated with the data packet has the first designation or the second designation based on a range within which the priority level falls.

24. An article of manufacture comprising a device driver program executable by a computer for adding an operation to a structure, wherein the device driver program causes operations to be performed, the operations comprising:
   if a priority level associated with a data packet identified by the operation has a first designation that comprises a high priority, placing the operation into a first structure storing a least number of operations; and
   if the priority level associated with the data packet identified by the operation has a second designation that comprises a low priority, placing the operation into a second structure storing a most number of operations.

25. The article of manufacture of claim 24, the operations further comprising:
   generating the priority level associated with the data packet based on content of the data packet.

26. The article of manufacture of claim 24, wherein the operations are removed from the first and second structures with a round robin technique.

27. The article of manufacture of claim 24, wherein the priority level associated with the data packet has the first designation or the second designation based on a range within which the priority level falls.

* * * * *